Nov. 19, 1935. H. M. PURNELL 2,021,746
POULTRY ROOST
Filed Oct. 2, 1933 2 Sheets-Sheet 2

Harry M. Purnell
Inventor

Patented Nov. 19, 1935

2,021,746

UNITED STATES PATENT OFFICE 2,021,746

POULTRY ROOST

Harry M. Purnell, Fairfield, Iowa, assignor to The Louden Machinery Company, Fairfield, Iowa, a corporation of Iowa Application October 2, 1933, Serial No. 691,742

3 Claims. (Cl. 119—22)

My invention relates to improvements in roosts for poultry and has particular relation to that type of roost having a board or pan beneath the perches to catch the droppings of the poultry. With roosts of this type it is necessary that easy access be had to the dropping pans for cleaning purposes to the end that the roost may be kept in a clean and sanitary condition.

The objects of the invention are to provide an inexpensive roost for poultry of sanitary design having no breeding places for vermin; to prevent disease by keeping the poultry from coming in contact with their droppings; to provide a roost wherein the pans may be cleaned without interference from the poultry during the cleaning process; and to provide such a roost having a maximum of head room under the dropping pans without raising the height of the roost, resulting in better lighting of the floor underneath, thereby making it an ideal scratching surface for the fowls.

Other advantages will appear from a consideration of the following description in conjunction with the accompanying drawings in which Fig. 1 is a perspective view of the roost showing one of the pans in lowered position for cleaning, the others being in raised position.

Figs. 2 and 3 are vertical transverse sections taken on the lines 2—2 and 3—3 of Fig. 1, in the direction of the arrows.

Figure 4:
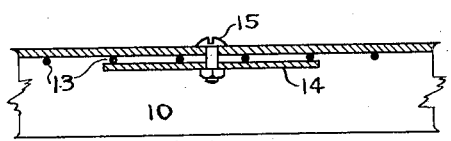
Fig. 4 is a detail view which will be hereafter explained.

Referring to the drawings, these show a frame consisting of side members 10 and end members 11, preferably made of angle iron and suitably secured together at the corners, supported by the legs 12. A meshed screen 13 is placed on the frame and is secured to the sides 10 and ends 11 by means of a clamp 14 held in engagement therewith by a bolt 15 (see Fig. 4). A plurality of perches 16 are placed transversely across the frame and are secured to the side members by bolts 17. To further support the screen 13, it may be stapled to the underside of the perches (not shown in the drawings) as the poultry in getting to the perches will walk on the screen. The perches 16 are rounded on the top surface to facilitate the perching of the poultry thereon.

The frame is provided with a series of dropping pans 18 positioned below the side members 10, so arranged that the droppings of the poultry on the perches will fall through the screen 13 and onto the pans. The pans may be made sufficiently wide to accommodate any desired number of perches, but I have found that the pans can be cleaned more readily by confining the width so that only one perch is directly over a pan, as is shown in the drawings. The pans may be made of any flat surfaced material and for this purpose I employ sheet metal having an angle iron 19 around three sides to make the pan rigid, the flanges of the angle iron being turned up. On the fourth side the flange of the angle iron 19A is turned down to permit the droppings on the pan to be scraped into a suitable container. The roost requires only a sufficient number of legs to support the weight thereon, and to provide the necessary supports for the pans, I use depending members 20 placed between the legs 12, and secured to the side members 10 by means of bolts 21.

Figure 5:
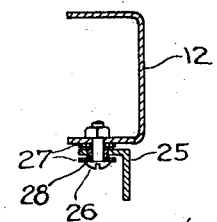
Fig. 5 is a horizontal section on line 5—5 of Fig. 2.
Figure 7:
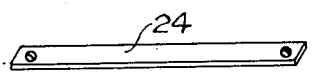
Figs. 7 and 8 are detail views of the pan supporting links.
Figure 6:
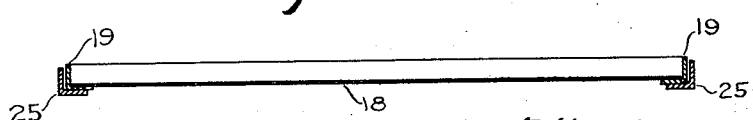
Fig. 6 is a transverse sectional view on line 6—6 of Fig. 1.
Figure 8:
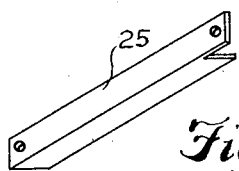

The legs 12 and depending members 20 are each provided a bracing member 22, one end of each brace member being secured to the leg or depending member, as the case may be, by a bolt 23 and the opposite end to the perch 16 by bolts 23. On the ends of the roost, the opposite end of the brace member is secured to the end members 11. The brace members act as a support for the rear ends of the dropping pans and have pivoted therein links 24, the opposite ends of the links being pivoted to the rear ends of the dropping pans. A series of links 25, made of angle iron, are pivoted on one end to each leg and depending member adjacent the front ends of the dropping pans. The opposite ends of the links 25 have pivotal connection with the front ends of the dropping pans. The links may be pivoted to the brace members and dropping pan in any approved manner, and as shown in Fig. 5, I use a bolt 26 having washers 27 thereon with a spacer 28 extending through the link and between the washers.

Figure 1:
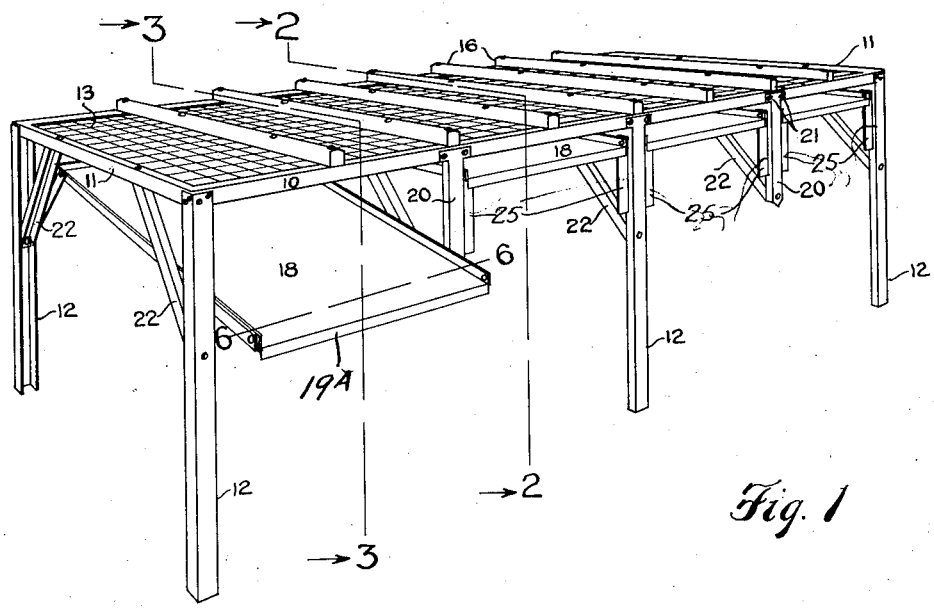
Figure 2:
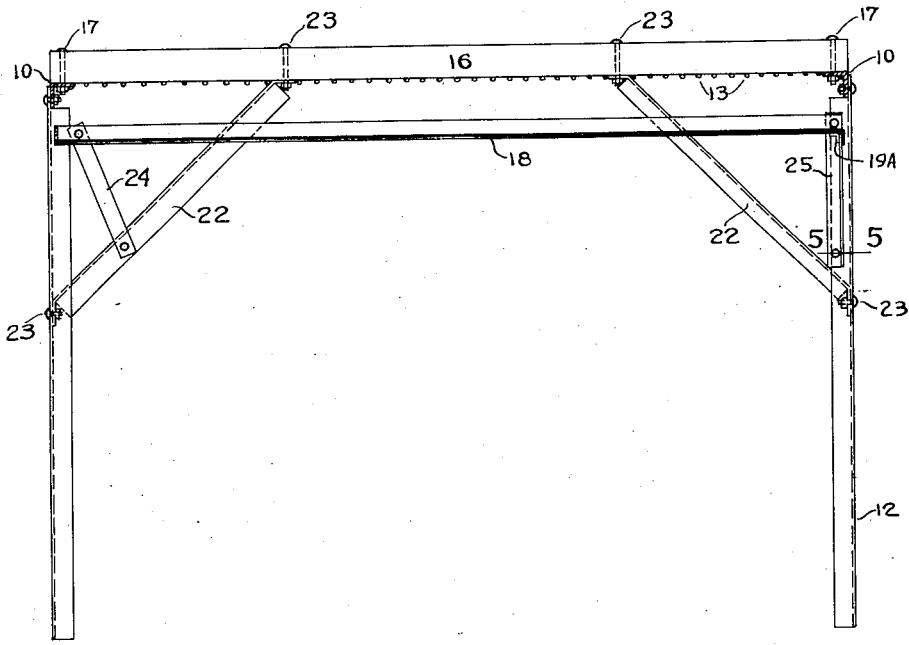
Figure 3:
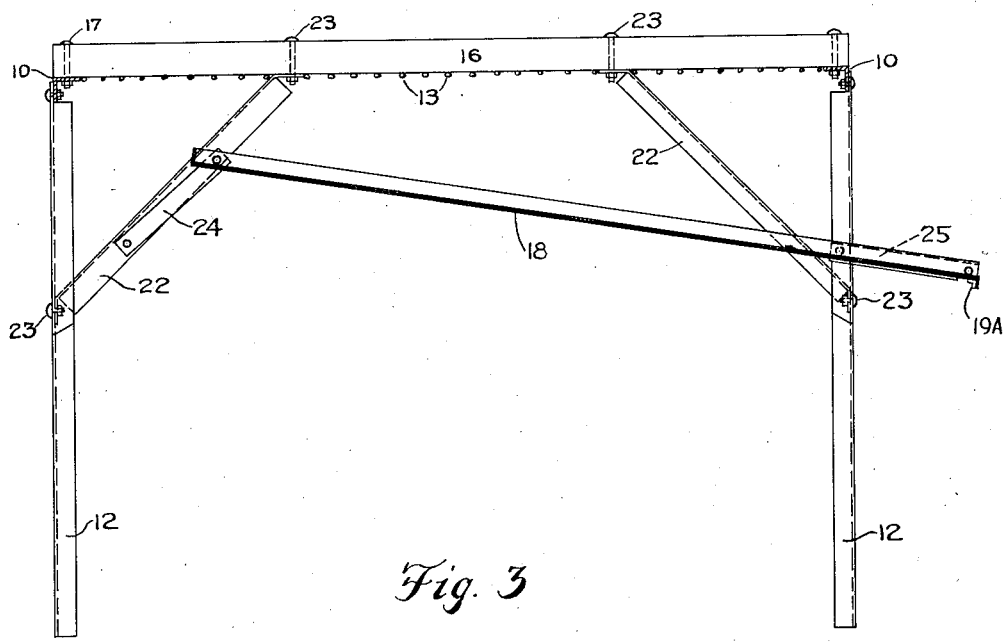

The dropping pans are thus movably mounted by means of the links, two on each side. In use, the pans are swung up and under the perches and meshed screen making it impossible for the poultry to contact with any droppings on the pans. When the pans are in this position (Fig. 2) it will be noted that the rear link 24 swings well past center or beyond its fulcrum point. The flange 19A of the angle iron on the fourth side of the pan is of a sufficient length to abut against the flanges on the member 25 when the pan is raised, thereby limiting the distance the pan 18 can move when it is swung up in closed position under the perches, and the pan is thereby held in this position until it is forcibly swung forward. To clean the pans a horizontal pull will cause the pan to move forward, describing an arc, the fulcrum points being so chosen as to cause the pans to project in front (Fig. 3) and at the same time tilting the pans to a convenient angle, thereby permitting the droppings on the pan to be readily scraped off the pans and into any suitable receptacle. In this position the front ends of the pans rest on the flanges of the links 25, thereby preventing the pans from swinging further, and it will be noted that when the pans are in this position the fulcrum and movable end of the links 25 are in a line parallel with the pan which tends to hold the pans rigid from horizontal thrusts while being scraped. To restore the pans to operative or closed position, it is necessary to lift the projecting end vertically and then rearwardly to closed position.

With my invention, poultry moving to and from the perches will walk on the screen and out of contact from all droppings, and all droppings from the poultry will fall onto the dropping pans from which they may be easily and quickly removed. Unless prevented, poultry have a tendency to pick in the droppings on the pans which interferes with the progress in cleaning the pans, but with my device the poultry have no access to the pans.

Modifications will be apparent to those skilled in the art and it is desired, therefore, that the invention be limited only by the prior art and the scope of the appended claims.

Having described my invention, what I claim and desire to secure by Letters Patent is:

1. A poultry roost having a screened frame with perches thereon and dropping pans below the screen, a plurality of means extending downwardly from the front and rear of the frame, some at least of said means serving as supports for the frame, means for projecting portions of the pans beyond one side of the frame comprising pairs of oppositely disposed links pivoted at one end to the rear ends of the pans and at the other end to the downwardly extending means at the rear of the frame, and a second series of pairs of oppositely disposed flanged links pivoted at one end to the front end of the pans and at the other end to the downwardly extending means at the front of the frame, the flanges of said links being adapted to contact the bottom of the pans to limit the downward movement of the pans.

2. A poultry roost having a screened supported frame with perches thereon and dropping pans below the screen, depending members secured to the sides of the frame between the supports, means for movably mounting the pans between the frame supports and depending members comprising pairs of oppositely disposed links pivoted at one end to the rear ends of the pans, the other ends of said links being pivoted to the frame supports and depending members respectively, and a second series of pairs of oppositely disposed flanged links pivoted at one end to the front ends of the pans, the other ends of said links being pivoted to the frame supports and depending members respectively, the flanges of said links being adapted to contact the bottom of the pans to limit the downward movement of the pans.

3. A poultry roost having a screened supported frame with perches thereon, dropping pans below the screen provided with a downturned flange on one side thereof, depending members secured to the sides of the frame between the supports, means for movably mounting the pans between the frame supports and depending members comprising pairs of oppositely disposed links pivoted at one end to the rear ends of the pans, the other ends of said links being pivoted to the frame supports and depending members respectively, and a second series of pairs of oppositely disposed flanged links pivoted at one end to the front ends of the pans, the other ends of said links being pivoted to the frame supports and depending members respectively, the flanges of said links being adapted to contact with the bottom of the pans when in cleaning position and with the down-turned flange on the pans when in closed position.

HARRY M. PURNELL.